(12) United States Patent
Yen et al.

(10) Patent No.: US 11,952,004 B2
(45) Date of Patent: Apr. 9, 2024

(54) LANE CHANGE ASSISTANCE METHOD, VEHICLE-MOUNTED DEVICE AND READABLE STORAGE MEDIUM

(71) Applicant: Chiun Mai Communication Systems, Inc., New Taipei (TW)

(72) Inventors: Hsiu-Hua Yen, New Taipei (TW); Jian-Cheng Lin, New Taipei (TW); Chih-Pu Hsu, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 363 days.

(21) Appl. No.: 17/235,084

(22) Filed: Apr. 20, 2021

(65) Prior Publication Data

US 2021/0323557 A1 Oct. 21, 2021

(30) Foreign Application Priority Data

Apr. 20, 2020 (CN) .......................... 202010313367.4

(51) Int. Cl.
*B60W 50/14* (2020.01)
*B60W 30/18* (2012.01)
*B60W 40/06* (2012.01)
*G06N 20/00* (2019.01)
*G06V 10/56* (2022.01)
*G06V 20/56* (2022.01)

(52) U.S. Cl.
CPC ...... *B60W 50/14* (2013.01); *B60W 30/18163* (2013.01); *B60W 40/06* (2013.01); *G06N 20/00* (2019.01); *G06V 10/56* (2022.01); *G06V 20/588* (2022.01); *B60W 2050/143* (2013.01); *B60W 2050/146* (2013.01); *B60W 2552/53* (2020.02); *B60W 2555/60* (2020.02); *B60W 2556/25* (2020.02); *B60W 2556/40* (2020.02)

(58) Field of Classification Search
CPC ........... B60W 50/14; B60W 30/18163; B60W 40/06; B60W 2050/143; B60W 2050/146; B60W 2552/53; B60W 2555/60; B60W 2556/25; B60W 2556/40; G06N 20/00; G06V 10/56; G06V 20/588; G08G 1/0112; G08G 1/0129; G08G 1/0175; G08G 1/167
See application file for complete search history.

(56) References Cited

U.S. PATENT DOCUMENTS

| 11,628,858 | B2 * | 4/2023 | Jiang | ................ | G01C 21/3407 |
| | | | | | 701/26 |
| 2018/0346019 | A1 * | 12/2018 | Fujii | ..................... | B62D 1/286 |
| 2020/0211399 | A1 * | 7/2020 | Zhang | ............. | G08G 1/096775 |

(Continued)

FOREIGN PATENT DOCUMENTS

| CN | 103838370 | 6/2014 |
| CN | 106652468 | 5/2017 |

(Continued)

*Primary Examiner* — Peter D Nolan
*Assistant Examiner* — Ashley L Redhead, Jr.
(74) *Attorney, Agent, or Firm* — ScienBiziP, P.C.

(57) ABSTRACT

A lane change assistance method is provided. The method includes recognizing styles of two traffic lines corresponding to a lane where a vehicle is located. Whether the vehicle violates traffic rules is determined according to the styles of the two traffic lines when the vehicle is performing an operation of changing lanes. A prompt is issued when the vehicle violates traffic rules.

9 Claims, 4 Drawing Sheets

(56) References Cited

U.S. PATENT DOCUMENTS

| | | | |
|---|---|---|---|
| 2020/0240806 A1* | 7/2020 | Daikoku | G01C 21/38 |
| 2020/0250438 A1* | 8/2020 | Schachter | G01C 21/30 |
| 2020/0317218 A1* | 10/2020 | Mao | B60K 31/18 |
| 2021/0042869 A1* | 2/2021 | Zheng | H04L 9/3239 |
| 2021/0070286 A1* | 3/2021 | Green | B60W 60/0027 |
| 2021/0089042 A1* | 3/2021 | Zhu | G05D 1/0223 |
| 2021/0158700 A1* | 5/2021 | Mao | G06V 20/56 |
| 2021/0208282 A1* | 7/2021 | Hamaguchi | G08G 1/0133 |
| 2021/0323557 A1* | 10/2021 | Yen | G06V 20/588 |
| 2022/0019817 A1* | 1/2022 | Li | B60W 30/12 |
| 2022/0081000 A1* | 3/2022 | Jiang | B60W 60/0011 |
| 2023/0059106 A1* | 2/2023 | Takahashi | B60W 30/12 |
| 2023/0115240 A1* | 4/2023 | Sidhu | B60W 60/0061 |
| | | | 701/25 |

FOREIGN PATENT DOCUMENTS

| | | |
|---|---|---|
| CN | 206479647 U | 9/2017 |
| CN | 108082192 A | 5/2018 |
| CN | 108346316 A | 7/2018 |
| CN | 109204319 | 1/2019 |
| CN | 109871776 A | 6/2019 |
| CN | 110160552 | 8/2019 |
| CN | 106652468 B | 9/2019 |

* cited by examiner

LANE CHANGE ASSISTANCE METHOD, VEHICLE-MOUNTED DEVICE AND READABLE STORAGE MEDIUM

FIELD

The present disclosure relates to vehicle control technology, in particular to a lane change assistance method, a vehicle-mounted device, and a readable storage medium.

BACKGROUND

Drivers should change lanes quickly and sometimes frequently while driving. However, if lane changing is not done in accordance with traffic rules, driving safety is compromised and the driver may receive a fine.

DETAILED DESCRIPTION

In order to provide a clearer understanding of the objects, features, and advantages of the present disclosure, the same are given with reference to the drawings and specific embodiments. It should be noted that the embodiments in the present disclosure and the features in the embodiments may be combined with each other without conflict.

In the following description, numerous specific details are set forth in order to provide a full understanding of the present disclosure. The present disclosure may be practiced otherwise than as described herein. The following specific embodiments are not to limit the scope of the present disclosure.

Unless defined otherwise, all technical and scientific terms herein have the same meaning as used in the field of the art technology as generally understood. The terms used in the present disclosure are for the purposes of describing particular embodiments and are not intended to limit the present disclosure.

Figure 1:
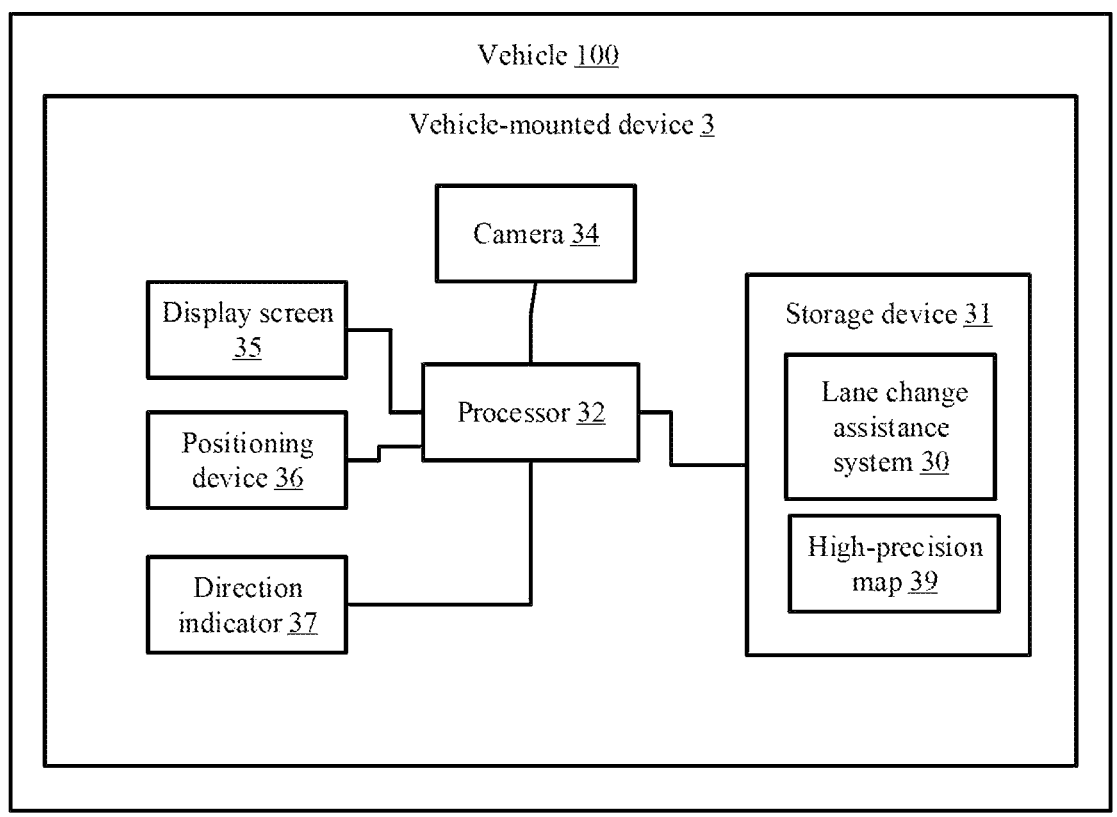
FIG. 1 illustrates a schematic diagram of a vehicle-mounted device of the present disclosure.

FIG. 1 illustrates a schematic diagram of a vehicle-mounted device of the present disclosure.

In at least one embodiment, the vehicle-mounted device 3 is installed on a vehicle 100. The vehicle-mounted device 3 is essentially a vehicle-mounted computer. The vehicle-mounted device 3 includes a storage device 31, at least one processor 32, at least one camera 34, a display screen 35, a positioning device 36, and a direction indicator 37. The above listed components are electrically connected to each other.

Those skilled in the art should understand that the structure of the vehicle-mounted device 3 shown in FIG. 1 does not constitute a limitation of the embodiment of the present disclosure. The vehicle-mounted device 3 may further include more or less other hardware or software than that shown in FIG. 1, or the vehicle-mounted device 3 may have different component arrangements.

It should be noted that the vehicle-mounted device 3 is merely an example. If other kind of vehicle-mounted devices can be adapted to the present disclosure, it should also be included in the protection scope of the present disclosure, and incorporated herein by reference.

In some embodiments, the storage device 31 may be used to store program codes and various data of computer programs. For example, the storage device 31 may be used to store a lane change assistance system 30 and a high-precision map 39 installed in the vehicle-mounted device 3, and implement high-speed and automatic completion of storing programs or data during operation of the vehicle-mounted device 3. The storage device 31 may include Read-Only Memory (ROM), Programmable Read-Only Memory (PROM), and Erasable Programmable Read-Only Memory (EPROM), One-time Programmable Read-Only Memory (OTPROM), Electronically-Erasable Programmable Read-Only Memory (EEPROM), Compact Disc Read-Only Memory (CD-ROM) or other optical disk storage, disk storage, magnetic tape storage, or any other non-transitory computer-readable storage medium that can be used to carry or store data.

In some embodiments, the at least one processor 32 may be composed of an integrated circuit. For example, the at least one processor 32 can be composed of a single packaged integrated circuit, or multiple packaged integrated circuits with same function or different function. The at least one processor 32 includes one or more central processing units (CPUs), one or more microprocessors, one or more digital processing chips, one or more graphics processors, and various control chips. The at least one processor 32 is a control unit of the vehicle-mounted device 3. The at least one processor 32 uses various interfaces and lines to connect various components of the vehicle-mounted device 3, executes programs or modules or instructions stored in the storage device 31, and invokes data stored in the storage device 31 to perform various functions of the vehicle-mounted device 3 and process data, for example, perform a function of assisting in changing lanes for the vehicle 100 (for details, see the description of FIG. 3).

In this embodiment, the at least one camera 34 can be installed at any position on the vehicle 100 where there the at least one camera 34 can capture images of two traffic lines corresponding to a lane in which the vehicle 100 is currently located. The two traffic lines includes a traffic line at a left edge of the lane in which the vehicle 100 is currently located (to clearly describe the present disclosure, hereinafter referred to as "left traffic line"), and a traffic line at a right edge of the lane in which the vehicle 100 is currently located (to clearly describe the present disclosure, hereinafter referred to as "right traffic line"). For example, the at least one camera 34 can be installed on a front windshield of the vehicle 100 or on a top of a body of the vehicle 100.

In this embodiment, the traffic line indicates road information such as guidance, restrictions, warnings, etc. to drivers. For example, referring to FIG. 4, when the vehicle 100 is traveling on a lane d of a road 2, the two traffic lines corresponding to the lane d includes a right traffic line d1 of the lane d and a left traffic line d2 of the lane d. As can be seen from the FIG. 4, the right traffic line d1 and the left traffic line d2 are adjacent to each other. A left traffic line d3 of the lane c is an adjacent traffic line of d2. In other words, d2 has two adjacent lines including d1 and d3.

The display screen 35 may be a touch display screen for displaying various data of the vehicle-mounted device 3, such as a user interface of the high-precision map 39. In this embodiment, the high-precision map 39 may be a map such as a BAIDU high-precision map or other maps such as a GOOGLE high-precision map.

In this embodiment, the high-precision map 39 indicates all roads, all lanes of each road, the left traffic line and the right traffic line corresponding to each lane, a style of each traffic line, and other characteristics.

It should be noted that the style of the traffic line of the lane indicates whether the vehicle 100 can change lanes in the lane. For example, when the style of the left traffic line of the lane where the vehicle 100 is located is a white dashed line, the style of the left traffic line indicates that the vehicle 100 can change lanes to the left. For another example, when the style of the right traffic line of the lane where the vehicle 100 is located is a solid white line, the style of the right traffic line indicates that the vehicle 100 cannot change lanes to the right, that is, changing lanes to the right is prohibited.

In this embodiment, the positioning device 36 can be used to locate a current position (such as longitude and latitude information) of the vehicle 100. In one embodiment, the positioning device 36 may be a combination of GPS (Global Positioning System) device and a gyroscope. In other embodiments, the positioning device 36 can be a Global Positioning System (GPS), an Assisted Global Positioning System (AGPS), a BeiDou Navigation Satellite System (BDS), a global navigation satellite system (GLONASS), or a combination thereof.

The direction indicator 37 warns other vehicles and pedestrians about the presence and intention of the vehicle 100 when the direction indicator 37 is turned on. In detail, when the direction indicator 37 is turned on, the direction indicator 37 flashes to indicate that the vehicle 100 is turning left or right. The direction indicator 37 includes at least one left turn signal and at least one tight turn signal. When the left turn signal is turned on, the left turn signal flashes to indicate that the vehicle 100 is turning left. When the right turn signal is turned on, the right turn signal flashes to indicate that the vehicle 100 is turning right.

In this embodiment, the lane change assistance system 30 may include one or more modules. The one or more modules are stored in the storage device 31, and executed by at least one processor (e.g. the at least one processor 32 in this embodiment), such that a function of assisting in changing lanes for the vehicle 100 is achieved (for details, see the introduction to FIG. 3 below).

Figure 2:
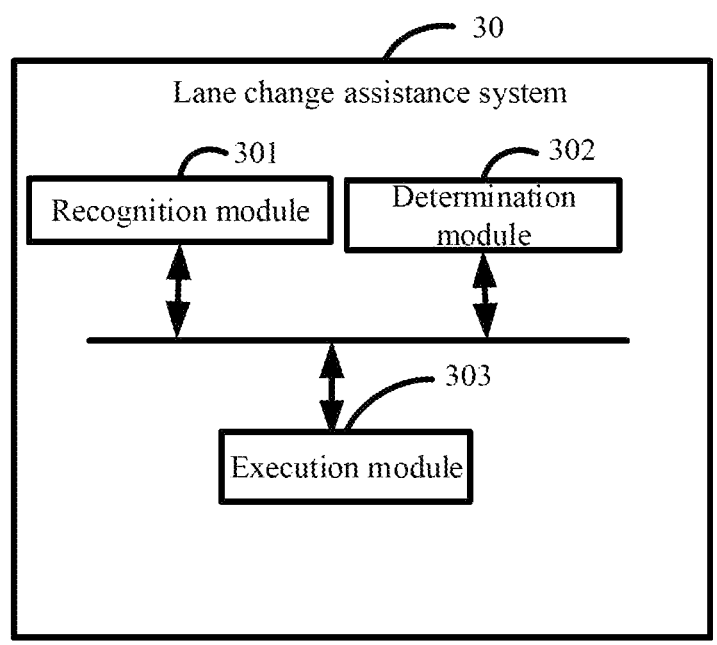
FIG. 2 shows one embodiment of modules of a lane change assistance system of the present disclosure.

In this embodiment, the lane change assistance system 30 may include a plurality of modules. Referring to FIG. 2, the plurality of modules includes a recognition module 301, a determination module 302, and an execution module 303. The modules referred to in the present disclosure refer to a series of computer-readable instructions that can be executed by at least one processor (for example, the at least one processor 32), can complete fixed functions, and can be stored in a storage device (for example, the storage device 31 of the vehicle-mounted device 3). In this embodiment, the functions of each of the modules will be described in detail with reference to FIG. 3.

Figure 3:
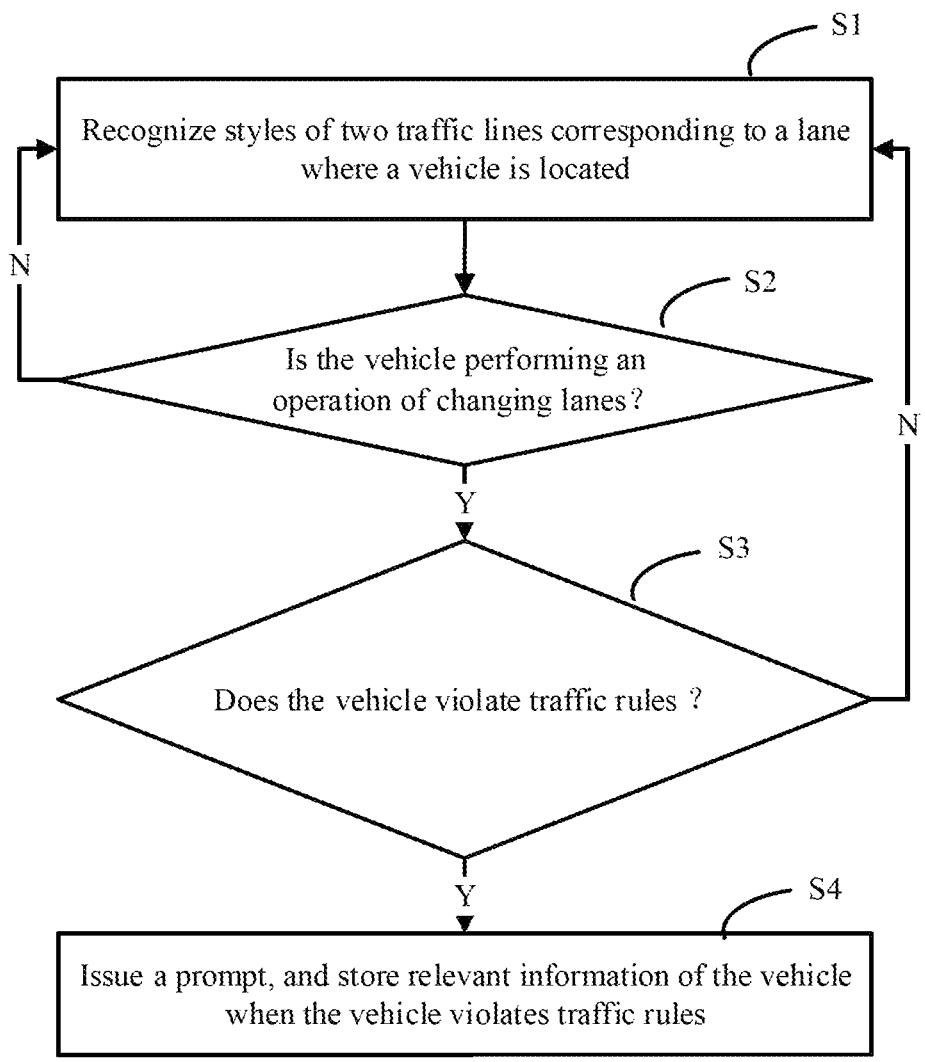
FIG. 3 shows a flow chart of one embodiment of a lane change assistance method of the present disclosure.

In this embodiment, an integrated unit implemented in a form of a software functional module can be stored in a non-transitory readable storage medium. The above listed modules include one or more computer-readable instructions. The vehicle-mounted device 3 or a processor implements the one or more computer-readable instructions, such that the method for assisting in changing lanes for the vehicle 100 shown in FIG. 3 is achieved.

In a further embodiment, referring to FIG. 2, the at least one processor 32 can execute an operating system of the vehicle-mounted device 3, various types of applications (such as the lane change assistance system 30 described above), program codes, and the like.

In a further embodiment, the storage device 31 stores program codes of a computer program, and the at least one processor 32 can invoke the program codes stored in the storage device 31 to achieve related functions. For example, each of the modules of the lane change assistance system 30 shown in FIG. 2 is a program code stored in the storage device 31. Each of the modules of the lane change assistance system 30 shown in FIG. 2 is executed by the at least one processor 32, such that the functions of the modules are achieved, and a purpose of assisting in changing lanes for the vehicle 100 (see the description of FIG. 3 below for details) is achieved.

In one embodiment of the present disclosure, the storage device 31 stores one or more computer-readable instructions, and the one or more computer-readable instructions are executed by the at least one processor 32 to achieve a purpose of assisting in changing lanes for the vehicle 100. Specifically, the computer-readable instructions executed by the at least one processor 32 to achieve the purpose of assisting in changing lanes for the vehicle 100 is described in detail in FIG. 3 below.

FIG. 3 is a flowchart of a lane change assistance method according to a preferred embodiment of the present disclosure.

In this embodiment, the lane change assistance method can be applied to the vehicle-mounted device 3. For the vehicle-mounted device 3 that requires to assist changing lanes for a vehicle, the vehicle-mounted device 3 can be directly integrated with the function of assisting in changing lanes. The vehicle-mounted device 3 can also achieve the function of assisting in changing lanes by running a Software Development Kit (SDK).

Referring to FIG. 3, the method is provided by way of example, as there are a variety of ways to carry out the method. The method described below can be carried out using the configurations illustrated in FIG. 1, for example, and various elements of these figures are referenced in the explanation of the method. Each block shown in FIG. 3 represents one or more processes, methods, or subroutines, carried out in the method. Furthermore, the illustrated order of blocks is illustrative only and the order of the blocks can be changed. Additional blocks can be added or fewer blocks can be utilized without departing from this disclosure. The method can begin at block S1.

At block S1, the recognition module 301 can recognize the styles of the two traffic lines corresponding to the lane where the vehicle 100 is currently located.

As mentioned above, the two traffic lines corresponding to the lane where the vehicle 100 is currently located includes the traffic line at the left edge of the lane where the vehicle 100 is currently located (i.e., the left traffic line) and the traffic line at the right edge of the lane where the vehicle 100 is currently located (i.e., the right traffic line). For example, referring to FIG. 4, it is assumed that the vehicle 100 is currently located in the lane d, the recognition module 301 recognizes the styles of the right traffic line and the left traffic line of the lane d, namely, d1 and d2. For example, the recognition module 301 recognizes that the style of the right traffic line d1 is a white solid line, and the style of the left traffic line d2 is a white dashed line.

In a first embodiment, the recognizing the styles of the two traffic lines corresponding to the lane where the vehicle 100 is currently located includes: locating the lane where the vehicle 100 is currently located on the preset high-precision map 39 using the positioning device 36; and obtaining the styles of the two traffic lines corresponding to the lane where the vehicle 100 is currently located from the high-precision map 39. In one embodiment, the high-precision map 39 indicates the traffic lines on the left edge and the right edge of each lane of each road, and the style of each traffic line, such as a shape and/or a color of each traffic line.

In a second embodiment, the recognizing the styles of the two traffic lines corresponding to the lane where the vehicle 100 is currently located includes: taking an image of the two traffic lines corresponding to the lane where the vehicle 100 is currently located using the at least one camera 34; and recognizing the styles of the two traffic lines corresponding to the lane where the vehicle 100 is currently located from the image using an image recognition algorithm.

In this embodiment, the at least one camera 34 may be installed on the front windshield of the vehicle 100, on edge of a body of the vehicle 100, on a water tank cover, or on a top of a body of the vehicle 100, as long as the at least one camera 34 can capture the two traffic lines of the lane where the vehicle 100 is located.

In this embodiment, the recognizing the styles of the two traffic lines corresponding to the lane where the vehicle 100 is currently located from the image using the image recognition algorithm, including: recognizing image features of each of the two traffic lines from the image using the image recognition algorithm. The image features include a color feature and/or a shape feature.

In this embodiment, the image recognition algorithm may be a template matching method. For example, the recognition module 301 can use various styles of traffic lines (such as white solid lines, yellow solid lines, white dashed lines, and yellow dashed lines) as templates, respectively, and match each template with the captured image. When one of the templates matches the traffic line in the captured image, the recognition module 301 determines that the style of the traffic line in the captured image is the style of the traffic line of the one of the templates.

In one embodiment, the recognition module 301 may first recognize the styles of the two traffic lines corresponding to the lane where the vehicle 100 is currently located according to the first embodiment. If the styles of the two traffic lines corresponding to the lane where the vehicle 100 is currently located cannot be recognized according to the first embodiment, then the recognition module 301 can recognize the styles of the two traffic lines corresponding to the lane where the vehicle 100 is currently located according to the second embodiment.

At block S2, the determination module 302 can determine whether the vehicle 100 is performing an operation of changing lanes. When the vehicle 100 is performing the operation of changing lanes, the process goes to block S3.

In a first embodiment, the determining whether the vehicle 100 is performing the operation of changing lanes including (a1)-(a2):

(a1) Detecting a Distance Between the Vehicle 100 and Each of the Two Traffic Lines in Real Time.

In one embodiment, the determination module 302 can detect the distance between the vehicle 100 and each of the two traffic lines in real time using the at least one camera 34.

Figure 5:
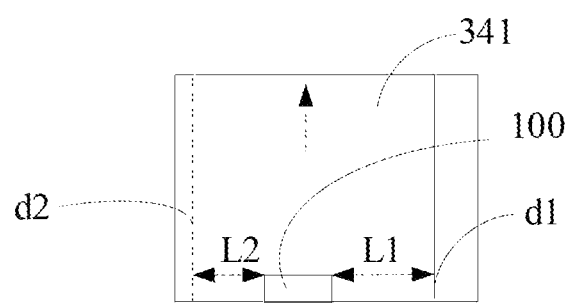
FIG. 5 illustrates a distance between an edge of a vehicle and a traffic line.

In this embodiment, the distance between the vehicle 100 and the left traffic line refers to a total number of pixels occupied by a shortest straight line between the left traffic line and a left edge of the vehicle 100 in the captured image. The distance between the vehicle 100 and the right traffic line refers to a total number of pixels occupied by a shortest straight line between the right traffic line and a right edge of the vehicle 100 in the captured image. For example, referring to FIG. 5, a total number of pixels of the shortest straight line L2 between the left edge of the vehicle 100 and the left traffic line d2 in the image 341 represents the distance between the vehicle 100 and the left traffic line d2. The total number of pixels of the shortest straight line L1 between the right edge of the vehicle 100 and the right traffic line d1 in the image 341 represents the distance between the vehicle 100 and the right traffic line d1.

(a2) Determining whether the vehicle 100 is performing the operation of changing lanes based on the distance between the vehicle 100 and each of the two traffic lines.

In this embodiment, when the distance between the vehicle 100 and one of the two traffic lines gradually decreases, and the distance between the vehicle 100 and another traffic line of the two traffic lines gradually increases at the same time, and when the vehicle 100 overlaps with the one of the traffic lines, the determination module 302 can determines that the vehicle 100 is performing the operation of changing lanes. In this embodiment, the vehicle 100 overlaps with the one of the traffic lines means that the total number of pixels occupied by the shortest straight line between the edge of the vehicle 100 and the one of the traffic lines is less than a preset value.

In other embodiments, as long as the determination module 302 recognizes that the vehicle 100 overlaps with the one of the traffic lines, the determination module 302 can determine that the vehicle 100 is performing the operation of changing lanes.

In a second embodiment, the determination module 302 can determine whether the vehicle 100 is performing the operation of changing lanes based on coordinates of the lane, the traffic line, and/or traffic signs stored in the high-precision map 39 and coordinates of the vehicle 100. In one embodiment, when the coordinates of the vehicle 100 have changed from a current lane to an adjacent lane of the current lane (i.e., a left lane or a right lane of the current lane), the determination module 302 can determine that the vehicle 100 is performing the operation of changing lanes. The determination module 302 can obtain the coordinates of the vehicle 100 on the preset high-precision map 39 in real time using the positioning device 36. The determination module 302 can obtain the coordinates of the lane, the traffic line, and/or traffic signs from the high-precision map 39.

In an embodiment, the vehicle 100 traveling from the current lane to the adjacent lane of the current lane may refer to a preset part of the body of the vehicle 100 (for example, ¼ of the body of the vehicle 100) in the adjacent lane, but the body of the vehicle 100 is not completely in the adjacent lane. That is, the vehicle 100 has not successfully changed lanes.

Figure 4:
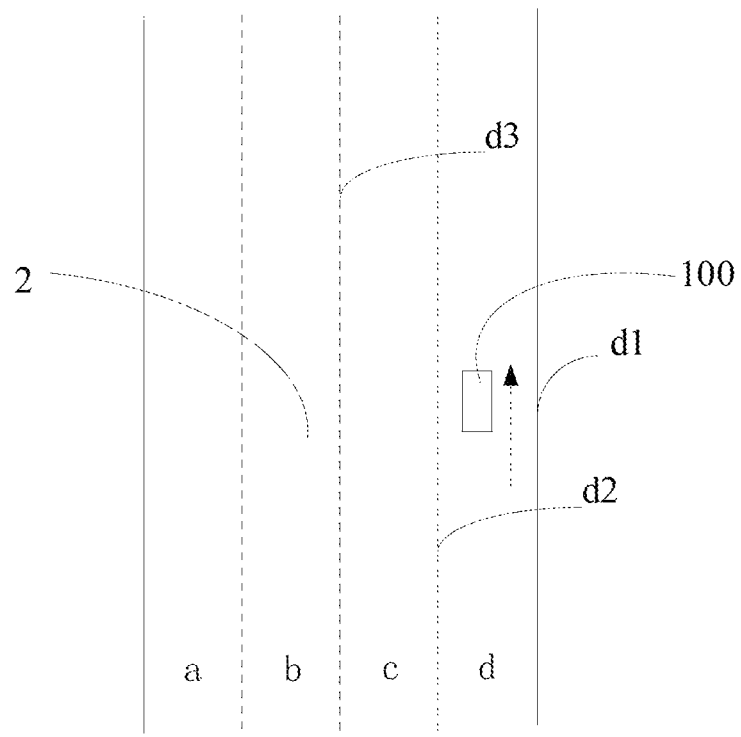
FIG. 4 illustrates traffic lines of a lane.

In a third embodiment, the determining whether the vehicle 100 is performing the operation of changing lanes includes: locating the current lane of the vehicle 100 on a preset high-precision map 39 in real time using the positioning device 36; determining that the vehicle 100 is performing the operation of changing lanes when a position of the vehicle 100 approaches one of the two traffic lines and a designated traffic line is recognized via the high-precision map 39. The designated traffic line refers to another adjacent traffic line of the one of the traffic lines. The another adjacent traffic line of the one of the traffic lines refers to a traffic line of a lane which is adjacent to the current lane of the vehicle 100. For example, as shown in FIG. 4, the right traffic line d1 and the left traffic line d2 are adjacent to each other. A left traffic line d3 of the lane c is an adjacent traffic line of d2, i.e., d3 is the another adjacent traffic line of d2. When the position of the vehicle 100 approaches d2, and d3 is recognized via the high-precision map 39, the determination module 302 can determine that the vehicle 100 is performing the operation of changing lanes.

It should be noted that the position of the vehicle 100 approaching one of the two traffic lines means that the distance between the vehicle 100 and the one of the two traffic lines is continuously smaller than the distance between vehicle 100 and the another traffic line, and the distance between the vehicle 100 and the one of the traffic lines gradually decreases.

It should also be noted that the two traffic lines corresponding to the lane where the vehicle 100 is currently located are traffic lines adjacent to each other. Therefore, the another adjacent traffic line of one of the traffic lines refers to a traffic line of an adjacent lane of the lane where the vehicle 100 is currently located. The two traffic lines corresponding to the adjacent lanes include the one of the traffic lines and the designated traffic line.

For example, the high-precision map 39 stores the coordinates of the traffic lines d1, d2, and d3, as shown in FIG. 4, the current coordinates of the vehicle 100 are in lane d (that is, the current coordinates of the vehicle 100 are between the coordinates of d1 and d2), the positioning device 36 locates the coordinates of the vehicle 100 on the high-precision map 39 in real time and returns the coordinates of the vehicle 100 to the determination module 302. When the determination module 302 determines that the coordinates of the vehicle 100 fall within a range between the traffic lines d2 and d3 (that is, lane c), the determination module 302 determines that the vehicle 100 is performing the operation of changing lanes.

At block S3, when the vehicle 100 is performing the operation of changing lanes, the execution module 303 determines whether the vehicle 100 violates traffic rules according to the styles of the two traffic lines. When the vehicle 100 violates traffic rules, the process goes to block S4.

In one embodiment, when the style of a certain traffic line of the two traffic lines indicates that lane change is prohibited, the execution module 303 determines that the vehicle 100 violates the traffic rules.

It should be noted that the certain traffic line refers to the traffic line corresponding to a direction the vehicle 100 changes lanes to. For example, when the vehicle 100 changes lanes to the left, the certain traffic line refers to the left traffic line of the lane where the vehicle 100 is currently located. In one embodiment, the execution module 303 determines whether the vehicle 100 violates traffic rules according to electrical signals of the direction indicator 37 and the style of the certain traffic line.

Specifically, the determining whether the vehicle 100 violates traffic rules includes (b1)-(b2):

(b1) Obtaining the electrical signal of the direction indicator 37 of the vehicle 100.

Specifically, the electrical signal of the direction indicator 37 may be obtained from a CAN (Controller Area Network) bus of the vehicle-mounted device 3. The electrical signal of the direction indicator 37 is a can signal.

(b2) When the style of the certain traffic line indicates that changing lanes is prohibited regardless whether or not the electrical signal of the direction indicator 37 indicates that the direction indicator 37 is turned on, it is determined that the vehicle 100 violates traffic rules; when the electrical signal of the direction indicator 37 indicates that the direction indicator 37 is turned on, and the style of the certain traffic line indicates that changing lanes is allowed, it is determined that the vehicle 100 does not violate the traffic rules.

Block S4, when the vehicle 100 violates the traffic rules, the execution module 303 issues a prompt according to a preset prompt mode.

In one embodiment, when the vehicle 100 violates the traffic rules, the execution module 303 also controls the vehicle 100 to decelerate, such that a driver of the vehicle 100 have more time to adjust the vehicle 100 to return to a correct lane and stop changing lanes.

In one embodiment, the preset prompting mode may refer to displaying text information on the display screen 35, and using the text information to prompt the driver of the vehicle 100 that changing lanes is in violation of traffic rules.

In other embodiments, the preset prompting mode may further include prompting the driver of the vehicle 100 that changing lanes is in violation of traffic rules by voice broadcast.

In one embodiment, when it is determined that the vehicle 100 changes lanes is in violation of traffic rules, the execution module 303 stores relevant information of the vehicle 100. For example, the relevant information of the vehicle 100 may be stored in a server communicatively connected with the vehicle-mounted device 3, and the server may be a server of a vehicle management company such as a taxi company or a logistics company. This facilitates the management of each vehicle by the vehicle management company. Of course, the execution module 303 may also store relevant information of the vehicle 100 in the storage device 31 of the vehicle-mounted device 3.

In one embodiment, the related information includes driver information of the vehicle 100 (such as the driver's name, driver's license number, etc.), a license plate number of the vehicle 100, a current location of the vehicle 100, and a current time that vehicle 100 violates traffic rules.

In an embodiment, the execution module 303 or the server may also periodically analyze traffic violations of all vehicles based on the stored related information of all vehicles. The analyzing traffic violations of all vehicles including, but not limited to: determining the drivers who violates traffic rules for the greatest/least number of times.

The execution module 303 or the server may also implement rewards and punishments to the driver based on the analysis results in combination with a reward and punishment mechanism. For example, an amount of bonuses may be deducted for drivers who violated traffic rules for the greatest number of times in a predetermined period of time (such as 1 month).

The above description is only embodiments of the present disclosure, and is not intended to limit the present disclosure, and various modifications and changes can be made to the present disclosure. Any modifications, equivalent substitutions, improvements, etc. made within the spirit and scope of the present disclosure are intended to be included within the scope of the present disclosure.

What is claimed is:

1. A lane change assistance method applicable to a vehicle-mounted device, the method comprising:
   locating a lane where a vehicle is located on a high-precision map using a positioning device;
   obtaining styles of two traffic lines corresponding to the lane from the high-precision map, wherein the two traffic lines comprise a left traffic line at a left edge of the lane, and a right traffic line at a right edge of the lane;

obtaining two total number of pixels in real time, by detecting a total number of pixels occupied by a shortest straight line between the left traffic line and a left edge of the vehicle in an image captured by at least one camera and detecting a total number of pixels occupied by a shortest straight line between the right traffic line and a right edge of the vehicle in the image;

determining whether the vehicle is performing the operation of changing lanes based on the two total number of pixels;

determining whether the vehicle violates traffic rules according to the styles of the two traffic lines if it is determined that the vehicle is performing the operation of changing lanes; and issuing a prompt if it is determined that the vehicle violates traffic rules.

2. The lane change assistance method according to claim 1, wherein if one of the two total number of pixels gradually decreases, another one of the two total number of pixels gradually increases, and the vehicle overlaps with the one of the traffic lines, determining that the vehicle is performing the operation of changing lanes.

3. The lane change assistance method according to claim 1, wherein the determining whether the vehicle violates traffic rules comprises:

obtaining an electrical signal of a direction indicator of the vehicle;

determining that the vehicle violates traffic rules when the style of one of the two traffic lines indicates that changing lanes is prohibited regardless whether or not the electrical signal of the direction indicator indicates the direction indicator is turned on;

determining that the vehicle does not violate the traffic rules when the electrical signal of the direction indicator indicates that the direction indicator is turned on, and the style of the one of the two traffic lines indicates that changing lanes is allowed.

4. The lane change assistance method according to claim 1, further comprising:

storing relevant information of the vehicle when the vehicle violates traffic rules, wherein the related information comprises driver information of the vehicle, a license plate number of the vehicle, a current location of the vehicle, and a current time that vehicle violates traffic rules.

5. A vehicle-mounted device comprising:
a storage device; and
at least one processor;
wherein the storage device stores one or more programs, which when executed by the at least one processor, cause the at least one processor to:

locate a lane where a vehicle is located on a high-precision map using a positioning device;

obtain styles of two traffic lines corresponding to the lane from the high-precision map, wherein the two traffic lines comprise a left traffic line at a left edge of the lane, and a right traffic line at a right edge of the lane;

obtain two total number of pixels in real time, by detecting a total number of pixels occupied by a shortest straight line between the left traffic line and a left edge of the vehicle in an image captured by at least one camera and detecting a total number of pixels occupied by a shortest straight line between the right traffic line and a right edge of the vehicle in the image;

determine whether the vehicle is performing the operation of changing lanes based on the two total number of pixels;

determine whether the vehicle violates traffic rules according to the styles of the two traffic lines if it is determined that the vehicle is performing the operation of changing lanes; and issue a prompt if it is determined that the vehicle violates traffic rules.

6. The vehicle-mounted device according to claim 5, wherein if one of the two total number of pixels gradually decreases, another one of the two total number of pixels gradually increases, and the vehicle overlaps with the one of the traffic lines, determining that the vehicle is performing the operation of changing lanes.

7. The vehicle-mounted device according to claim 5, wherein the determining whether the vehicle violates traffic rules comprises:

obtaining an electrical signal of a direction indicator of the vehicle;

determining that the vehicle violates traffic rules when the style of one of the two traffic lines indicates that changing lanes is prohibited regardless whether or not the electrical signal of the direction indicator indicates that the direction indicator is turned on;

determining that the vehicle does not violate the traffic rules when the electrical signal of the direction indicator indicates that the direction indicator is turned on, and the style of the one of the two traffic lines indicates that changing lanes is allowed.

8. The vehicle-mounted device according to claim 5, wherein the at least one processor is further caused to:

store relevant information of the vehicle when the vehicle violates traffic rules, wherein the related information comprises driver information of the vehicle, a license plate number of the vehicle, a current location of the vehicle, and a current time that vehicle violates traffic rules.

9. A non-transitory storage medium having instructions stored thereon, when the instructions are executed by a processor of a vehicle-mounted device, the processor is configured to perform a lane change assistance method, wherein the method comprises:

locating a lane where a vehicle is located on a high-precision map using a positioning device;

obtaining styles of two traffic lines corresponding to the lane from the high-precision map, wherein the two traffic lines comprise a left traffic line at a left edge of the lane, and a right traffic line at a right edge of the lane;

obtaining two total number of pixels in real time, by detecting a total number of pixels occupied by a shortest straight line between the left traffic line and a left edge of the vehicle in an image captured by at least one camera and detecting a total number of pixels occupied by a shortest straight line between the right traffic line and a right edge of the vehicle in the image;

determining whether the vehicle is performing the operation of changing lanes based on the two total number of pixels;

determining whether the vehicle violates traffic rules according to the styles of the two traffic lines if it is determined that the vehicle is performing the operation of changing lanes; and issuing a prompt if it is determined that the vehicle violates traffic rules.

\* \* \* \* \*